(12) United States Patent  (10) Patent No.: US 6,655,061 B1
Good  (45) Date of Patent: Dec. 2, 2003

(54) ONE WAY FREE SPINNING HUBCAP

(76) Inventor: Lawrence D. Good, 1012 W. Vine St., Champaign, IL (US) 61821

( * ) Notice: Subject to any disclaimer, the term of this patent is extended or adjusted under 35 U.S.C. 154(b) by 0 days.

(21) Appl. No.: 10/201,295

(22) Filed: Jul. 24, 2002

(51) Int. Cl.[7] .............................. B60B 7/00; B60B 7/20; B60B 7/06; G09F 21/04
(52) U.S. Cl. ....................... 40/587; 40/591; 301/111.03
(58) Field of Search .............. 40/587, 591; 301/111.03, 301/108.1

(56) References Cited

U.S. PATENT DOCUMENTS 3,158,946 A   12/1964  Upchurch
5,490,342 A   2/1996   Rutterman et al.
5,588,715 A   12/1996  Harlen
5,659,989 A   8/1997   Hsiao et al.
6,120,104 A * 9/2000   Okamoto et al. ........ 301/37.25

* cited by examiner

Primary Examiner—Cassandra H. Davis
(74) Attorney, Agent, or Firm—Richard C. Litman

(57) ABSTRACT

A one way free spinning hubcap assembly having a decorative hubcap and a bracket assembly. The bracket assembly is attached to a vehicular wheel and the hubcap is rotatably attached thereto. A bearing clutch present in the bracket assembly permits the hubcap to rotate independently from the wheel when the wheel is rotated in one direction, but forces the hubcap to rotate concurrently with the wheel when rotational force is applied in the opposite direction. In this way the hubcap may be permitted to continue rotating after the associated wheel has ceased rotating.

10 Claims, 5 Drawing Sheets

ONE WAY FREE SPINNING HUBCAP

BACKGROUND OF THE INVENTION

1. Field of the Invention

The present invention relates to hubcaps, in particular to a hubcap assembly that permits a hubcap to spin independently from an associated vehicular wheel in only one direction of rotation.

2. Description of Related Art

There have been a plethora of inventions relating to rotating hubcaps and wheel covers. Many of these references, for example, U.S. Pat. No. 5,490,342 to Rutterman et al., U.S. Pat. No. 5,588,715 to Harlen, and U.S. Pat. No. 5,659,989 to Hsiao et al. disclose different mechanisms which allow a hubcap to maintain its rotational orientation independent of the rotation of the associated wheel. Each of these inventions employs some type of weighting mechanism to maintain the hubcap's orientation regardless of the reverse or forward rotation of the associated wheel. These inventions differ from the present invention in that the present invention employs no weighting mechanism, and permits the hubcap to rotate independently from its associated wheel in only one direction of rotation.

U.S. Pat. No. 3,158,946 discloses a spinning hub cap designed to be spun relative to the vehicle wheel on which it is mounted, as the vehicle wheel rolls forward, and to continue to spin after the vehicle wheel has been brought to a stop. The '946 invention differs from the present invention in that the present invention uses a bearing clutch rather than a rachet type mechanism to control hubcap rotation, and because the '946 invention lacks a hub bracket. Both of these features make the present invention more reliable, safer, and more cost effective to produce.

None of the above inventions and patents, taken either singly or in combination, is seen to describe the instant invention as claimed.

SUMMARY OF THE INVENTION

The one way free spinning hubcap assembly is a novelty device that allows a vehicle's hubcaps to freely spin in one direction independent of the rotation of the associated wheel. For example, when a vehicle using the invention accelerates or maintains its forward velocity the vehicles hubcaps are forced to spin at the same rate as the wheels. However, when the vehicle then slows or stops the hubcaps are free to continue spinning independently of the motion of the wheels.

The assembly has a hub bracket with a generally dome shaped body having a concave inner surface and a convex outer surface. Several legs extend from the bottom of the dome shaped body and terminate in feet extending perpendicularly from each leg. Defined in each foot is an aperture roughly the size of a wheel stud. An aperture, preferably threaded, is defined in the top of the dome between the inner and outer surfaces. When in use, the apertures in the feet are each positioned around a vehicular wheel stud and secured thereto with the vehicle's lug nuts.

The assembly further includes a central bolt with a head and a shank. The portion of the shank directly adjacent to the head is smooth while the balance of the shank is threaded. The central bolt is screwed into the aperture on the top of the dome and held there with two nuts, one adjacent to the inner surface (inner nut) of the dome and one adjacent to the outer surface (outer nut) of the dome.

The invention further includes a bolt collar. The bolt collar is a generally flat plate having an inner surface and an outer surface. A clutch bearing is positioned in the center of the collar and extends between the inner and outer surfaces. The collar is positioned around the central bolt, with the clutch bearing riding on the smooth portion of the central bolt between the head of the bolt and the top nut. A decorative hub cap is attached to the collar by screws.

When in use, the clutch forces the associated hubcap to rotate at the same speed as the associated wheel when the vehicle is traveling forward. When the vehicle slows, such as during braking the inertia permits the hubcap to spin independently of the wheel.

Accordingly, it is a principal object of the invention to provide a device which allows the free rotation of vehicular hubcaps, in one direction only, independently of the associated wheel.

It is another object of the invention to provide a device which projects the illusion of forward motion in a stopped vehicle.

It is a further object of the invention to provide a device that will improve the looks of a vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
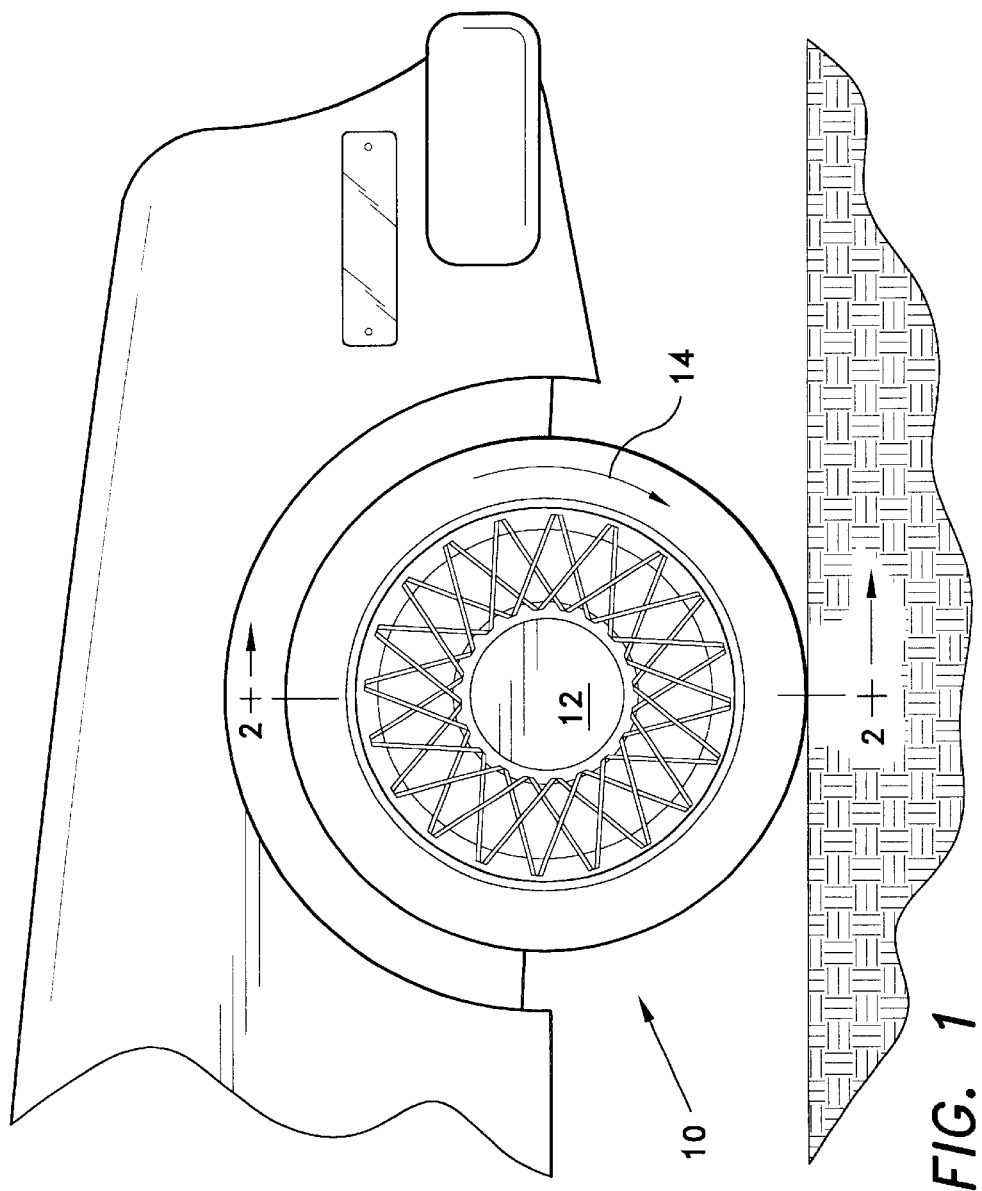
FIG. 1 is an environmental side view of a wheel having a one way free spinning hubcap assembly according to the present invention.

The present invention, as shown in FIG. 1, is a one way free spinning hubcap assembly, designated generally as 10 in the drawings. The assembly 10 has a decorative hubcap 12 that is positioned adjacent to a vehicular wheel. The internal mechanisms of the invention, discussed below, cause the hubcap to rotate with the wheel when the wheel is turning in the direction of arrow 14. Therefore, when a vehicle employing the present invention is accelerating forward or maintaining its forward velocity the hubcap rotates at the same speed as the associated wheel, as would a conventional hubcap. However, when the vehicle decelerates, a bearing clutch (discussed below) in the assembly 10 permits the hubcap to continue to freely rotate, giving the appearance that the entire wheel is quickly rotating even when the wheel itself is slowing or has stopped rotating.

Figure 2:
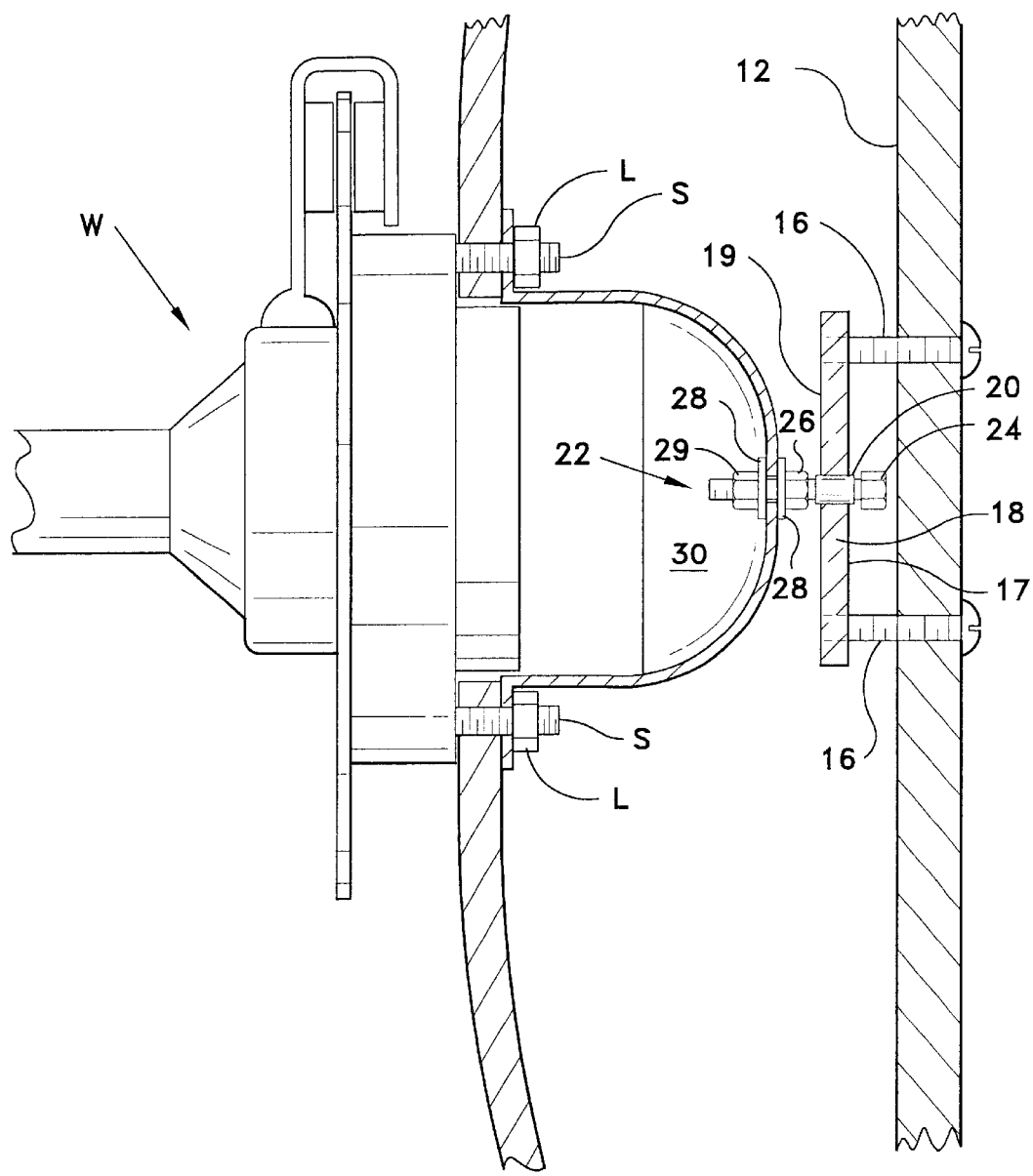
FIG. 2 is a section view along lines 2—2 of FIG. 1.
Figures 3A, 3B:
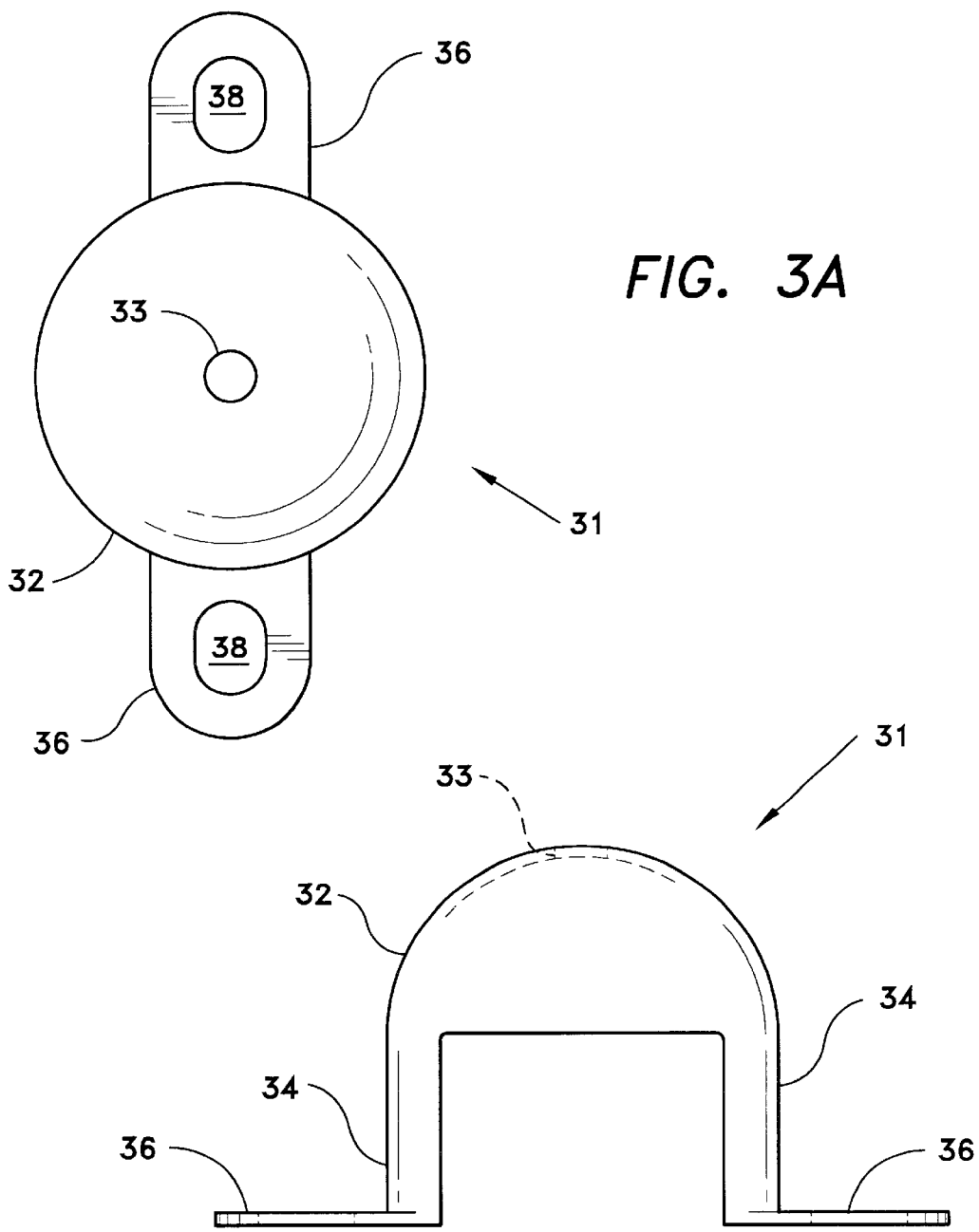
FIG. 3A is a top view of a two leg hub bracket according to the present invention.
FIG. 3B is a side view of the bracket of FIG. 3A according to the present invention.
Figure 3C:
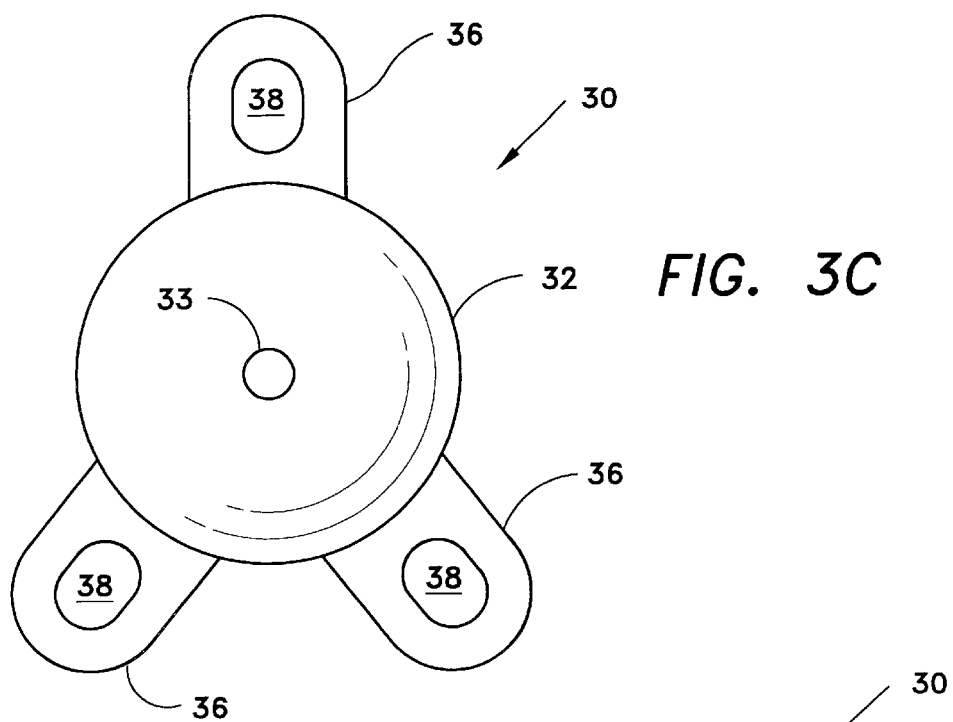
FIG. 3C is a top view of a three leg hub bracket according to the present invention.
Figure 3D:
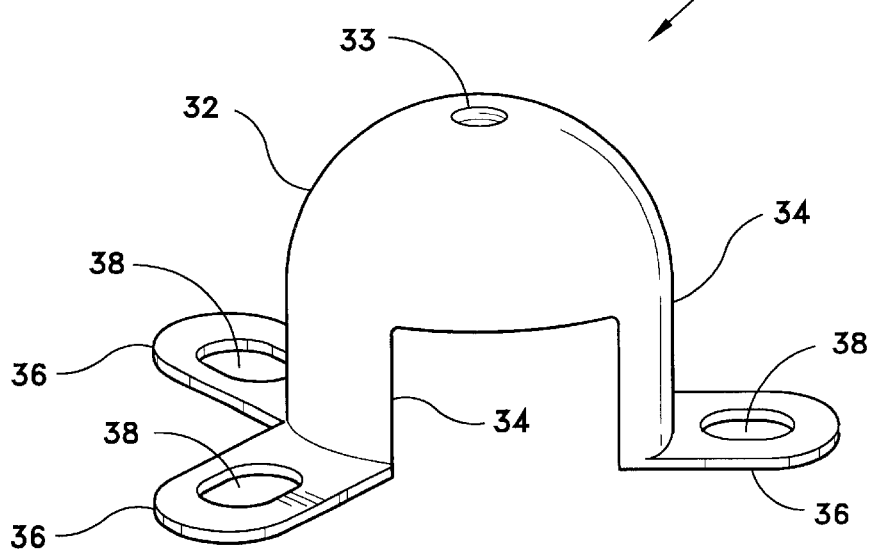
FIG. 3D is a perspective view of the bracket of FIG. 3C according to the present invention.

FIG. 2 illustrates a sectional view of the present invention. The assembly 10 has a hubcap 12 which is connected by several hubcap bolts 16 to a bolt collar 18. The bolt collar 18 is a flat plate with an outer surface 17 and an inner surface 19. Disposed in the center of the collar 18 and extending just past the outer 17 and inner 19 surfaces is a bearing clutch 20.

The assembly 10 further includes a central bolt 22 having a head 24 and a shank. The central bolt 22 extends through the bearing clutch 20 and the associated bolt collar 18. Next, the central bolt 22 extends through an outer nut 26 and a lock washer 28, then through a dome shaped hub bracket 30, (detailed below). The central bolt 22 finally extends through a second lock washer 28 and is secured by inner nut 29. The hub bracket 30 itself is secured to a vehicle's wheel assembly W through the use of the vehicle's wheel studs S and lug nuts L.

FIGS. 3A–3D illustrate two different embodiments of the hub bracket, designated as 31 and 30, respectively. Each embodiment has a dome shaped body 32 with a concave inner surface and a convex outer surface. A threaded aperture 33 is defined in the top of the body 32. Extending from the bottom of the body 32 are a plurality of legs 34. The legs 34 extend downward from the base of the dome-shaped body 32 and terminate in perpendicularly disposed feet 36. Defined in each foot 36 is an aperture 38 having a diameter larger than the diameter of a vehicular wheel stud S. The difference between the hub bracket embodiments 30, 31 stems from the brackets having differing numbers of legs 34 and feet 36. Generally, hub brackets may include any number of legs 34 and feet 36, with brackets having even numbers of legs 34 and feet 36 being designed for wheel assemblies with an even number of wheel studs, and with hub brackets 30 with odd numbers of legs 34 and feet 36 being designed for wheel assemblies with an odd number of wheel studs. Either type of hub bracket 30, 31 is interchangeable with the rest of the invention and the invention is not limited to a hub bracket of any particular number of legs 34 or of feet 36.

The bracket 31 is shown with two feet 36, and the bracket 30 is shown with three feet 36. The number of feet 36 need not be equal to the number of wheel studs S.

Referring back to FIG. 2, the body 32 of the hub bracket 30 is designed to be positioned adjacent to a wheel assembly with the wheel studs S being positioned inside the foot apertures 38. The bracket is then secured thereto with the wheel's existing lug nuts L.

Figure 4:
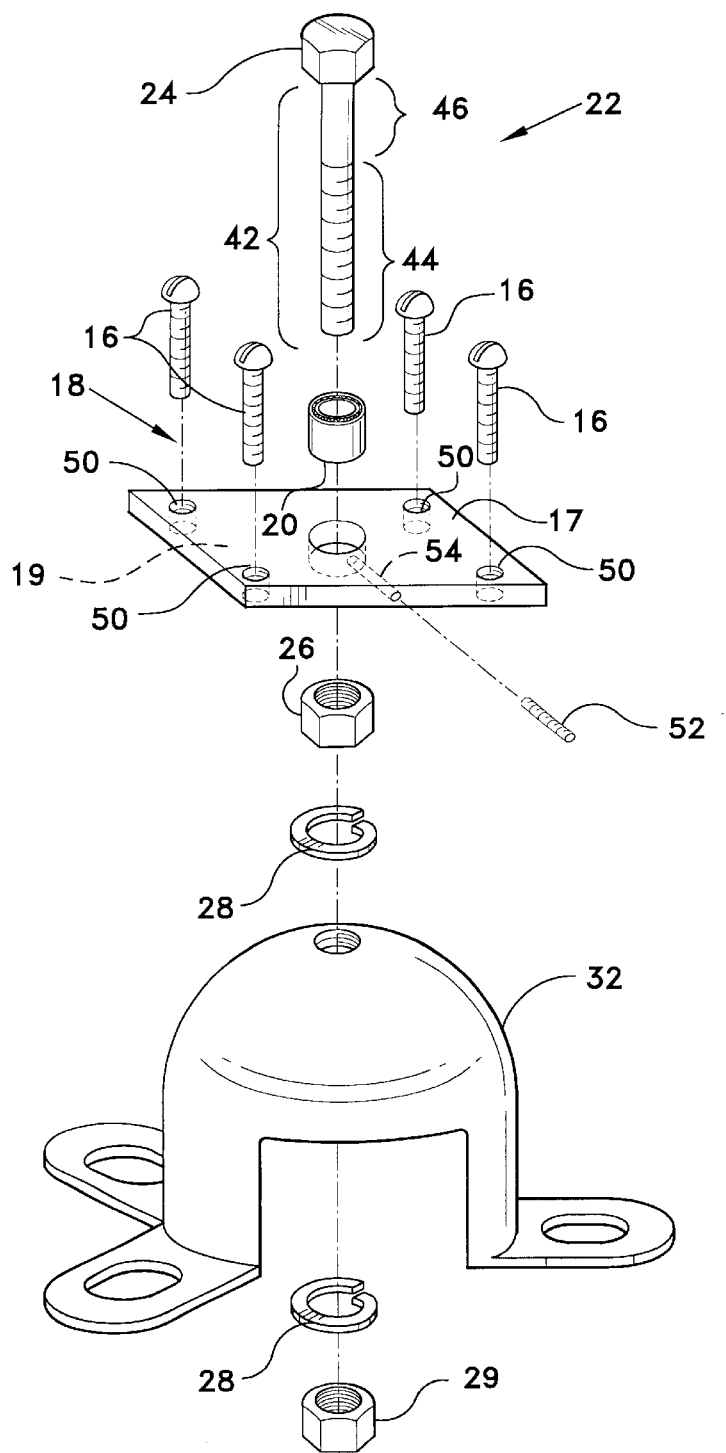
FIG. 4 is an exploded perspective view of the spinner assembly, the hubcap being omitted for clarity.

FIG. 4 illustrates and exploded view of the present invention. The central bolt 22 is made up of a head 24 and a shank 42. The shank has a threaded section 44 and a smooth journal portion 46 that is adjacent to the head 24. The threaded section 44 has right-hand threads (normally) for devices intended for wheels on the driver's or left side of a vehicle, and left-hand threads (reverse) for devices intended for the passenger's or right side of a vehicle. When assembled, the bearing clutch 20 rotates on the journal portion 46 of bolt 22.

In order to facilitate the spinning of the bolt collar 18 and the associated hubcap 12 (not shown) the length of the bearing clutch 20 should be greater than the distance between the outer 17 and inner 19 surfaces of the bolt collar 18. The length of the journal portion 46 of bolt 22 should also be greater than the length of the bearing clutch 20. In this way the friction of rotation is minimized.

The bolt collar 18 is shown as a flat rectangular plate with several holes defined therein. The rectangular shape is not critical to the invention and may be altered so long as the collar 18 remains balanced around the bearing clutch 20, e.g., square, circular, etc. A plurality of holes 50 are defined between the outer surface 17 and the inner surface 19 of the collar 18.

Hubcap bolts 16 extend through these holes 50 and are the preferred method used to secure a hubcap 12 (not shown) to the bolt collar 18. Any number of other means are available to secure the hubcap to the collar 18, including adhesives, clips or latches. A second plate may also be secured to the hubcap 12 and the hubcap bolts 16 may be secured thereto. This option is especially useful with specialty hubcaps.

A second hole 54 may also be disposed in the plane of the bolt collar 18. The hole 54 extends from the edge of the collar 18 to the bearing clutch 20. A set screw 52 may be inserted into the collar 18 through the hole 54 and used to secure the bearing clutch 20.

Bearing clutch 20 may be any conventionally available bearing clutch, usually of the type having roller or needle bearings for engaging a shaft and a mechanism for restricting rotation to a single direction, e.g., cams.

It is to be understood that the present invention is not limited to the sole embodiment described above, but encompasses any and all embodiments within the scope of the following claims.

I claim:

1. A one way free spinning hubcap assembly, comprising:
   a planar bolt collar having a center;
   a bearing clutch disposed in the center of said bolt collar;
   a hub bracket adapted for attachment to a wheel hub;
   a shaft having a threaded portion and a smooth journal portion, the threaded portion extending through said hub bracket and the journal portion extending through said bearing clutch, whereby said collar is rotatable on said shaft; and
   a hubcap attached to said collar;
   wherein said bearing clutch permits rotation in a single direction.

2. The one way free spinning hub cap according to claim 1, wherein said hub bracket has:
   a dome-shaped body having a bottom periphery;
   a plurality of legs depending from the periphery of said dome-shaped body; and
   a plurality of feet extending normal to said legs, the feet having apertures defined therein sized and dimensioned for securing said hub bracket to a motor vehicle's wheel studs.

3. The one way free spinning hub cap according to claim 1, wherein said shaft comprises a central bolt having a head and a shank, the shank having a smooth journal portion adjacent the head and having a threaded end for securing said shaft to said hub bracket.

4. The one way free spinning hub cap according to claim 1, further comprising a pair of nuts engaging the threaded portion of said shaft on opposite sides of said hub bracket for securing said shaft to said hub bracket.

5. The one way free spinning hub cap according to claim 4, further comprising a pair of lock washers disposed on said shaft between said nuts and said hub bracket.

6. The one way free spinning hub cap according to claim 1, wherein said collar has a periphery and a bore defined therein extending from the periphery to the center of said collar, the collar further comprising a set screw disposed in said bore and clamping said bearing clutch to said collar.

7. The one way free spinning hub cap according to claim 1, wherein said hub bracket has:

a dome-shaped body having a top and having a bottom edge;

three legs depending from the bottom edge of said dome-shaped body; and three feet extending normal to said legs;

wherein an aperture is defined in the top of said body.

8. The one way free spinning hub cap according to claim 1, wherein said hub bracket has:

a dome-shaped body having a top and having a bottom edge;

two legs depending from the bottom edge of said dome-shaped body; and two feet extending normal from said legs;

wherein an aperture is defined in the top of said body.

9. The one way free spinning hub cap according to claim 1, wherein said hub bracket has an internally threaded bore defined therein, the threaded portion of said shaft being received in said bore for attaching said collar to said hub bracket.

10. A one way spinning hubcap assembly, comprising:

a hubcap having an inside and an outside surface;

a generally flat bolt collar having an inner surface and an outer surface, with a front surface of said collar being disposed upon a back surface of said hubcap;

a bearing clutch disposed in the center of said bolt collar;

a first nut;

a second nut first lock washer;

a second lock washer;

a hub bracket having a dome shaped body with a top, a bottom edge, an inner surface and an outer surface;

two legs each having a top and bottom end with each top end being disposed upon the bottom edge of said dome shaped body; and two feet disposed upon the bottom end of each said leg, perpendicular thereto;

a central bolt having a head and a shank, said shank having a threaded portion and a smooth journal portion, said journal portion being directly adjacent to said head;

wherein an aperture is defined in the top of said body;

wherein said bearing clutch, said first nut, said first lock washer, said hub bracket and said second lock washer, and said second nut are disposed in order on said central bolt;

wherein said bearing clutch is disposed upon the journal portion of said central bolt; and wherein said bolt extends, through the hole in said hub bracket.

* * * * *